US009825732B1

(12) United States Patent
Yang

(10) Patent No.: US 9,825,732 B1
(45) Date of Patent: Nov. 21, 2017

(54) SIGNAL PROCESSING METHOD AND CIRCUIT FOR SUPPRESSING CO-CHANNEL INTERFERENCE

(71) Applicant: ALI CORPORATION, Hsinchu (TW)

(72) Inventor: Yong Yang, Shanghai (CN)

(73) Assignee: ALI CORPORATION, Hsinchu (TW)

( * ) Notice: Subject to any disclaimer, the term of this patent is extended or adjusted under 35 U.S.C. 154(b) by 0 days.

(21) Appl. No.: 15/372,468

(22) Filed: Dec. 8, 2016

(30) Foreign Application Priority Data

Aug. 12, 2016 (CN) .......................... 2016 1 0659373

(51) Int. Cl.
*H04L 1/00* (2006.01)
*H04L 27/26* (2006.01)
*H04L 5/00* (2006.01)
*H04L 25/02* (2006.01)
*H04L 25/03* (2006.01)

(52) U.S. Cl.
CPC ........ *H04L 1/0061* (2013.01); *H04L 27/2602* (2013.01); *H04L 5/005* (2013.01); *H04L 5/0051* (2013.01); *H04L 5/0062* (2013.01); *H04L 5/0073* (2013.01); *H04L 25/0204* (2013.01); *H04L 25/0226* (2013.01); *H04L 25/03821* (2013.01)

(58) Field of Classification Search
CPC . H04L 5/0062; H04L 5/0073; H04L 25/0204; H04L 25/0226; H04L 25/03821; H04L 5/005; H04L 5/0051; H04L 1/0061; H04L 27/2602
See application file for complete search history.

(56) References Cited

U.S. PATENT DOCUMENTS

| 2008/0008258 A1* | 1/2008 | Tanabe ................ H04L 25/0204 375/267 |
| 2009/0047969 A1* | 2/2009 | Lee ....................... H04L 5/0048 455/446 |
| 2012/0114053 A1* | 5/2012 | Karthik ................. H04L 25/022 375/260 |

* cited by examiner

*Primary Examiner* — Janice Tieu
(74) *Attorney, Agent, or Firm* — Li & Cai Intellectual Property (USA) Office

(57) ABSTRACT

Disclosed are a signal processing method and a signal processing circuit for suppressing Co-Channel Interference (CCI). By using the signal processing method and the signal processing circuit provided by the instant disclosure, determining whether each subcarrier is affected by CCI will be more precise because the non-data subcarrier and the data subcarrier are both processed. Moreover, in the instant disclosure, the results to determine whether the subcarriers are affected by CCI are recorded as an N×K error matrix, and thus the receiver may detect the static interference and the dynamic interference according to this N×K error matrix.

22 Claims, 10 Drawing Sheets

SIGNAL PROCESSING METHOD AND CIRCUIT FOR SUPPRESSING CO-CHANNEL INTERFERENCE

BACKGROUND OF THE INVENTION

1. Field of the Invention

The instant disclosure relates to a signal processing method and a signal processing circuit for suppressing interference; in particular, to a signal processing method and a signal processing circuit for suppressing Co-Channel Interference (CCI).

2. Description of Related Art

The Orthogonal Frequency-Division Multiplexing (OFDM) technology is a kind of Multicarrier Modulation technology and is widely used in the field of the broadband wireless communication. The major working principle of the OFDM technology is to divide the limited bandwidth into a plurality of sub-channels, and to transmit signal by a plurality of subcarriers. By using different modulation mechanisms, different amounts of data can be carried by the subcarriers. The subcarriers are orthogonal with each other, and thus compared with the traditional Frequency Division Multiplexing (FDM) technology, the OFDM technology provides a better spectral utilization.

However, several systems may share the same frequency band, and thus the signal transmission of these systems may mutually interfere, which is commonly called the Co-Channel Interference (CCI). The CCI often occurs among the transmissions of certain kinds of signals, such as the PAL signal, the SECAM signal and the NTSC signal. When an OFDM signal is affected by the CCI, data carried by part of the subcarriers are thus damaged. As a result, the precision of the channel estimation decreases and the system performance seriously decreases. Accordingly, for an OFDM system, how to effectively suppress the CCI is an issue worth discussing for improving the system performance.

SUMMARY OF THE INVENTION

Considering the situation mentioned above, a signal processing method and a signal processing circuit for suppressing interference are provided in the instant disclosure. Particularly, this signal processing method and this signal processing circuit are for suppressing Co-Channel Interference (CCI).

The signal processing method for suppressing CCI provided in the instant disclosure can be adapted to a receiver in an OFDM system. This signal processing method comprises: receiving an OFDM signal comprising a plurality of symbols by the receiver, and each symbol comprises K subcarriers and each of the K subcarriers is a non-data subcarrier or a data subcarrier; processing each non-data subcarrier and each data subcarrier related to each of the plurality of the symbols to obtain a first comparison result corresponding to each subcarrier; generating a N×K error matrix according to the first comparison results, and respectively executing a summation operation for N elements in each column of the N×K error matrix to obtain a sum related to the N elements in each column of the N×K error matrix; and respectively comparing the sum related to the N elements in each column of the N×K error matrix with M first threshold values to obtain a second comparison result corresponding to each column of the N×K error matrix, and determining whether the subcarriers are affected by CCI according to the second comparison results. K and M are both positive integers, and N is a variable and varies with different settings of the receiver.

The signal processing circuit for suppressing CCI provided in the instant disclosure could be used in a receiver in an OFDM system. This signal processing circuit comprises a reception module, a first operation module, a second operation module and a determination module. The reception module receives an OFDM signal. The OFDM signal comprises a plurality of symbols, each symbol comprises K subcarriers, and each of the K subcarriers is a non-data subcarrier or a data subcarrier. The first operation module processes each non-data subcarrier and each data subcarrier related to each of the plurality of the symbols to obtain a first comparison result corresponding to each subcarrier. The second operation module generates an N×K error matrix according to the first comparison results. After that, the second operation module respectively executes a summation operation for N elements in each column of the N×K error matrix to obtain a sum related to the N elements in each column of the N×K error matrix. The determination module respectively compares the sum related to the N elements in each column of the N×K error matrix with M first threshold values to obtain a second comparison result corresponding to each column of the N×K error matrix. Then, the determination module determines whether the subcarriers are affected by CCI according to each second comparison result. K and M are both positive integers, and N is a variable and varies with different settings of the receiver.

To sum up, by using the signal processing method and the signal processing circuit provided by the instant disclosure, whether each subcarrier is affected by CCI can be determined with more precision because the non-data subcarrier and the data subcarrier are both processed. Moreover, in the instant disclosure, the results to determine whether the subcarriers are affected by CCI are recorded as an N×K error matrix, and thus the receiver can know the static interference and the dynamic interference according to this N×K error matrix.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer and/or section from another element, component, region, layer and/or section discussed below. Thus, a first element, component, region, layer and/or section discussed below could be termed a second element, component, region, layer and/or section without departing from the teachings of the instant disclosure. As used herein, the term "and/or" includes any and all combinations of one or more of the associated listed items. In addition, for an easy instruction, similar reference numbers or symbols refer to elements alike.

The signal processing method and the signal processing circuit provided by the instant disclosure can be adapted to and used in a receiver in any OFDM signal. For example, the OFDM system can be an Integrated Services Digital Broadcasting (ISDB-T) system, a Digital Video Broadcasting over Terrestrial (DVB-T) system, a second-generation Digital Video Broadcasting over Terrestrial (DVB-T2) system. Those skilled in the art should be familiar with the working principle of the receiver in these OFDM systems, and thus relevant details are omitted herein.

Figure 1:
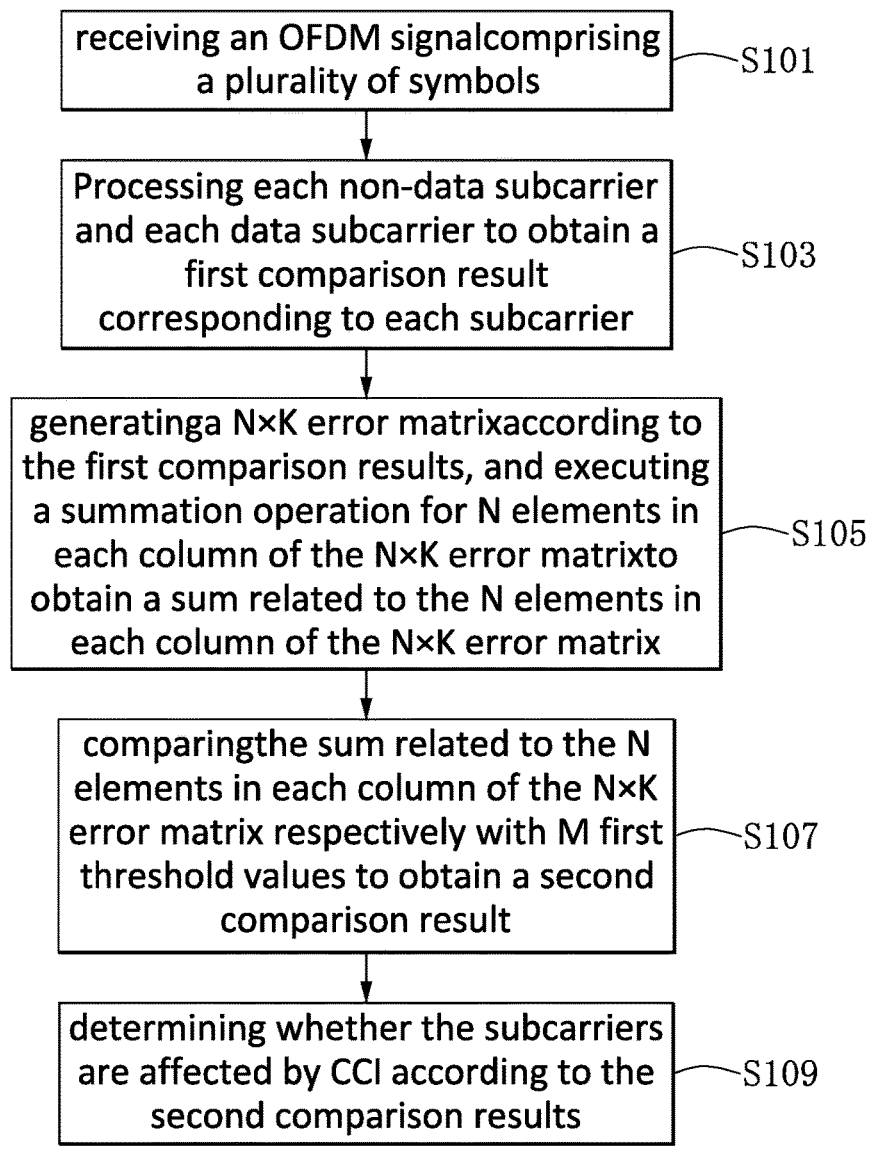
FIG. 1 shows a flow chart of a signal processing method for suppressing CCI of one embodiment of the instant disclosure.

Referring to FIG. 1, FIG. 1 shows a flow chart of a method for suppressing CCI of one embodiment of the instant disclosure. In step S101, a receiver receives an OFDM signal. This OFDM signal comprises a plurality of symbols, each symbol comprises K subcarriers and each of the K subcarriers is a non-data subcarrier or a data subcarrier. In other words, the type of the data subcarrier may be a non-data subcarrier or a data subcarrier. Then, in step S103, each non-data subcarrier and each data subcarrier related to each of the plurality of the symbols are processed to obtain a first comparison result corresponding to each subcarrier. After that, in step S105, a N×K error matrix is generated according to the first comparison results. Also, a summation operation for N elements in each column of the N×K error matrix is executed to obtain a sum related to the N elements in each column of the N×K error matrix.

In step S107, the sum related to the N elements in each column of the N×K error matrix is compared respectively with M first threshold values to obtain a second comparison result. Finally, step S109 is to determine whether the subcarriers are affected by CCI according to the second comparison results. The K and M described above are both positive integers, N is a variable and varies with settings of the receiver.

It should be easily understood by those skilled in the art that the method for suppressing CCI in the instant disclosure is executed after the signal synchronization of the OFDM signal is completed. Thus, the received OFDM signal received in step S101 is an OFDM that has been synchronized. However, the details about how to do the signal synchronization of the OFDM signal are not limited herein.

According to the standard of the OFDM system, after the signal synchronization of the OFDM signal is completed, each symbol has the same amount of subcarriers. For an easy instruction, in step S101, the amount of subcarriers that each symbol comprises is K. In addition, each symbol comprises different kinds of non-data subcarriers (e.g. a scattered pilot subcarrier or a continual pilot subcarrier) and data subcarriers. Thus, in the following description, the subcarrier may be a non-data subcarrier or a data subcarrier.

Figure 2:
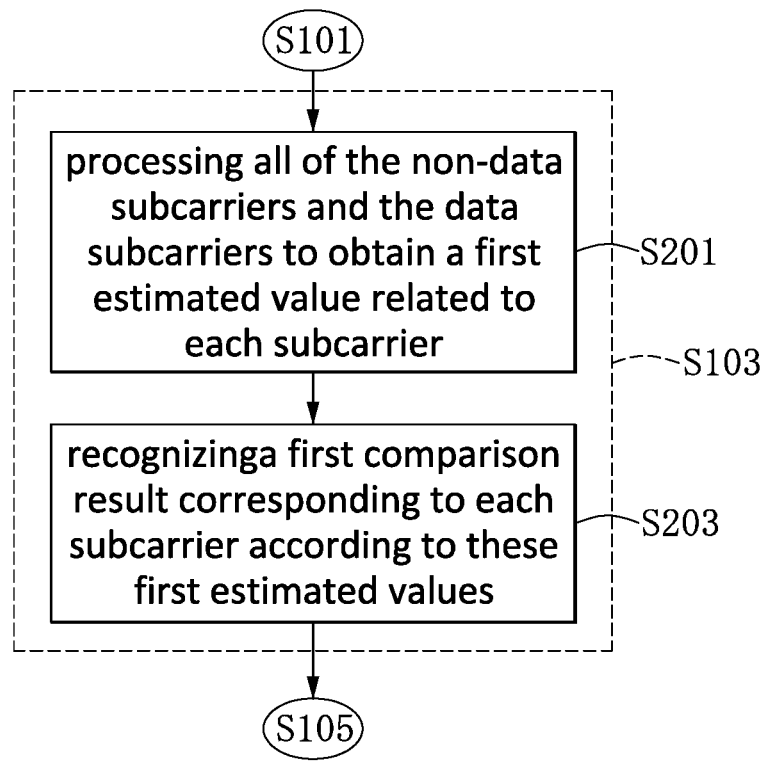
FIG. 2 is a flow chart showing how to obtain a first comparison result corresponding to each subcarrier in a signal processing method for suppressing CCI of one embodiment of the instant disclosure.

The details about how to obtain the first comparison result related to each subcarrier in step S103 are illustrated as follows. Referring to FIG. 2, FIG. 2 is a flow chart showing how to obtain a first comparison result corresponding to each subcarrier in a method for suppressing CCI of one embodiment of the instant disclosure. In addition, similar reference numbers or symbols refer to similar steps in FIG. 1 and FIG. 2.

Referring to FIG. 1 and FIG. 2, step S103 further comprises steps S201~S203. In step S201, the receiver processes all of the non-data subcarriers and the data subcarriers when receiving the OFDM signal to obtain a first estimated value related to each subcarrier. Then, in step S203, a first comparison result corresponding to each subcarrier is recognized according to these first estimated values.

Figure 3:
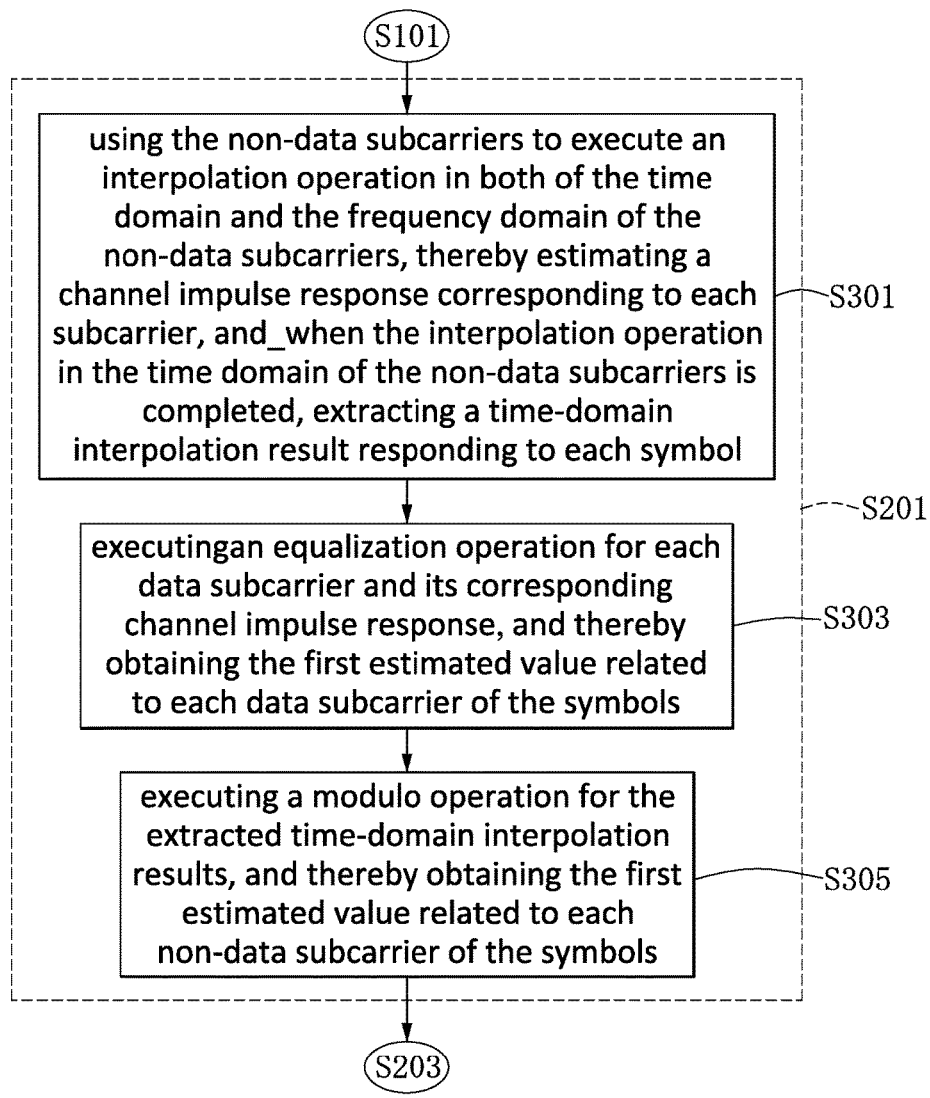
FIG. 3 is a flow chart showing how to obtain a first estimated value corresponding to each subcarrier in the method shown in FIG. 2.

The details about step S201 are illustrated as follows. Referring to FIG. 3, FIG. 3 is a flow chart showing how to obtain a first estimated value corresponding to each subcarrier in the method shown in FIG. 2. The following examples are for illustrating but not for restricting the instant disclosure. In addition, similar reference numbers or symbols refer to similar steps in FIG. 1, FIG. 2 and FIG. 3.

Referring to FIG. 2 and FIG. 3, step S201 further comprises steps S301~S305. In step S301, the receiver uses the non-data subcarriers to execute an interpolation operation in both the time domain and the frequency domain of the non-data subcarriers, and thereby estimate a channel impulse response corresponding to each subcarrier. Additionally, when the interpolation operation in the time domain of the non-data subcarriers is completed, the receiver respectively extracts a time-domain interpolation result responding to each symbol.

Then, in step S303, an equalization operation is executed for each data subcarrier and its corresponding channel impulse response, and thereby the first estimated value related to each data subcarrier of the symbols can be obtained. After that, in step S305, a modulo operation is executed for the extracted time-domain interpolation results, and thereby the first estimated value related to each non-data subcarrier of the symbols can be obtained. In this manner, the first estimated value related to each subcarrier can be also obtained.

According to the above, it should be known by those skilled in the art that steps S303 and S305 can be executed simultaneously without conflicts. In addition, the channel estimation operation for an OFDM system to execute an interpolation operation described above and to estimate a channel impulse response corresponding to each subcarrier should be easily understood by those skilled in the art. Thus, the relevant details are omitted herein. Moreover, in step S303, the modulo operation executed for the extracted time-domain interpolation results is for estimating the initial value of the data subcarrier transmitted by the OFDM system, which is the first estimated value related to each data subcarrier.

Likewise, in step S305, the modulo operation executed for the extracted time-domain interpolation results is for estimating the initial value of the non-data subcarrier transmitted by the OFDM system, which is the first estimated value related to each non-data subcarrier. However, the way to estimate the initial value of each subcarrier transmitted by the OFDM system, which is the first estimated value related to each subcarrier, can be chosen or designed depending on need.

Figure 4:
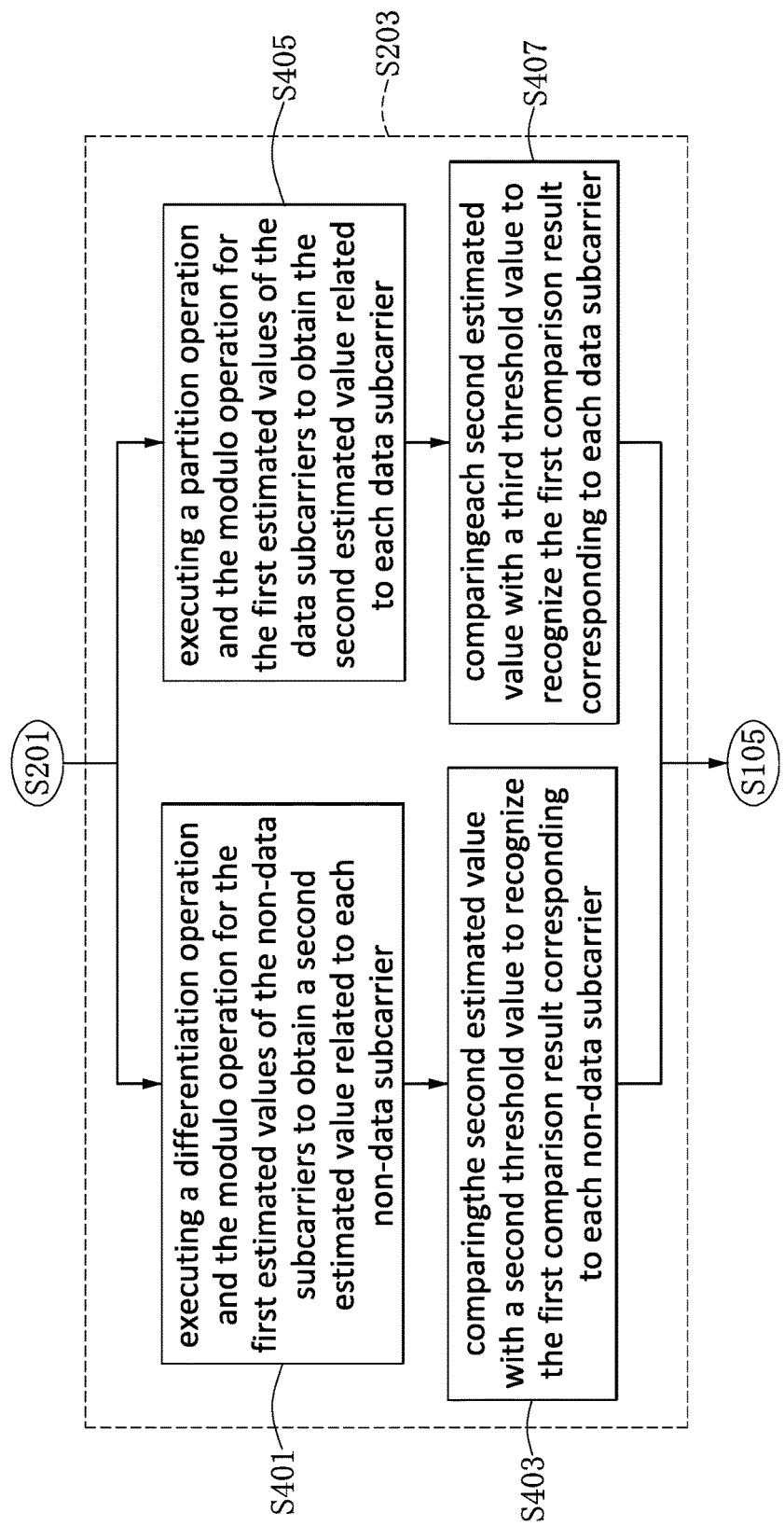
FIG. 4 is a flow chart showing how to recognize the first comparison result corresponding to each subcarrier according to the first estimated values in the method shown in FIG. 2.

The details about step S203 are illustrated as follows. Referring to FIG. 4, FIG. 4 is a flow chart showing how to recognize the first comparison result corresponding to each subcarrier according to the first estimated values in the method shown in FIG. 2. Similar reference numbers or symbols refer to similar steps in FIG. 1, FIG. 2 and FIG. 4.

Referring to FIG. 2 and FIG. 4, step S203 further comprises steps S401~S407. In step S401, the receiver executes a differentiation operation and the modulo operation for the first estimated values of the non-data subcarriers to obtain a second estimated value related to each non-data subcarrier. Then, in step S403, the second estimated value is compared with a second threshold value to recognize the first comparison result corresponding to each non-data subcarrier.

After that, in step S405, the receiver executing a partition operation and the modulo operation for the first estimated values of the data subcarriers to obtain the second estimated value related to each data subcarrier. Then, in step S407, each second estimated value is compared with a third threshold value to recognize the first comparison result corresponding to each data subcarrier. Thereby, the first comparison result corresponding to each subcarrier can be recognized.

According to the above, it should be known by those skilled in the art that steps S401, S403, S405 and S407 can be executed simultaneously without conflicts, as shown in FIG. 4. Those skilled in the art should be familiar with the differentiation operation, the partition operation and the modulo operation described above, and thus the relevant details are omitted herein. However, it is still worth mentioning that step S203 is mainly to execute the differentiation operation or the partition operation for a non-data subcarrier or a data subcarrier, and to compare the result obtained after executing the above operation with certain threshold values. For example, in step S203, for a non-data subcarrier, the result obtained after executing the above operation is compared with a second threshold value, but for a data subcarrier, the result obtained after executing the above operation is compared with a third threshold value. In this manner, it can be preliminarily determined whether each subcarrier is affected by CCI.

Figure 5A:
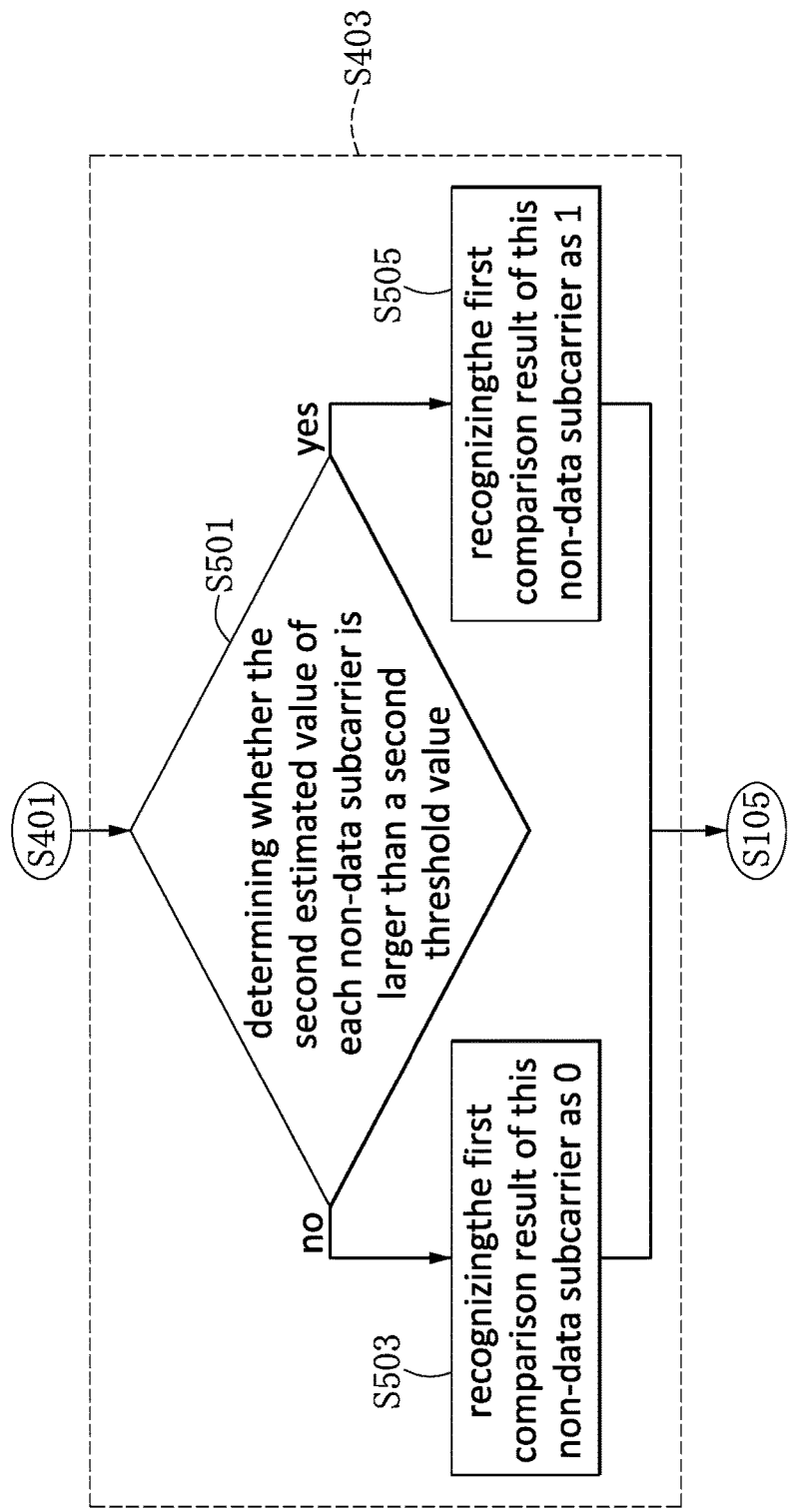
FIG. 5A is a flow chart showing how to recognize the first comparison result corresponding to each non-data subcarrier in the method shown in FIG. 4.
Figure 5B:
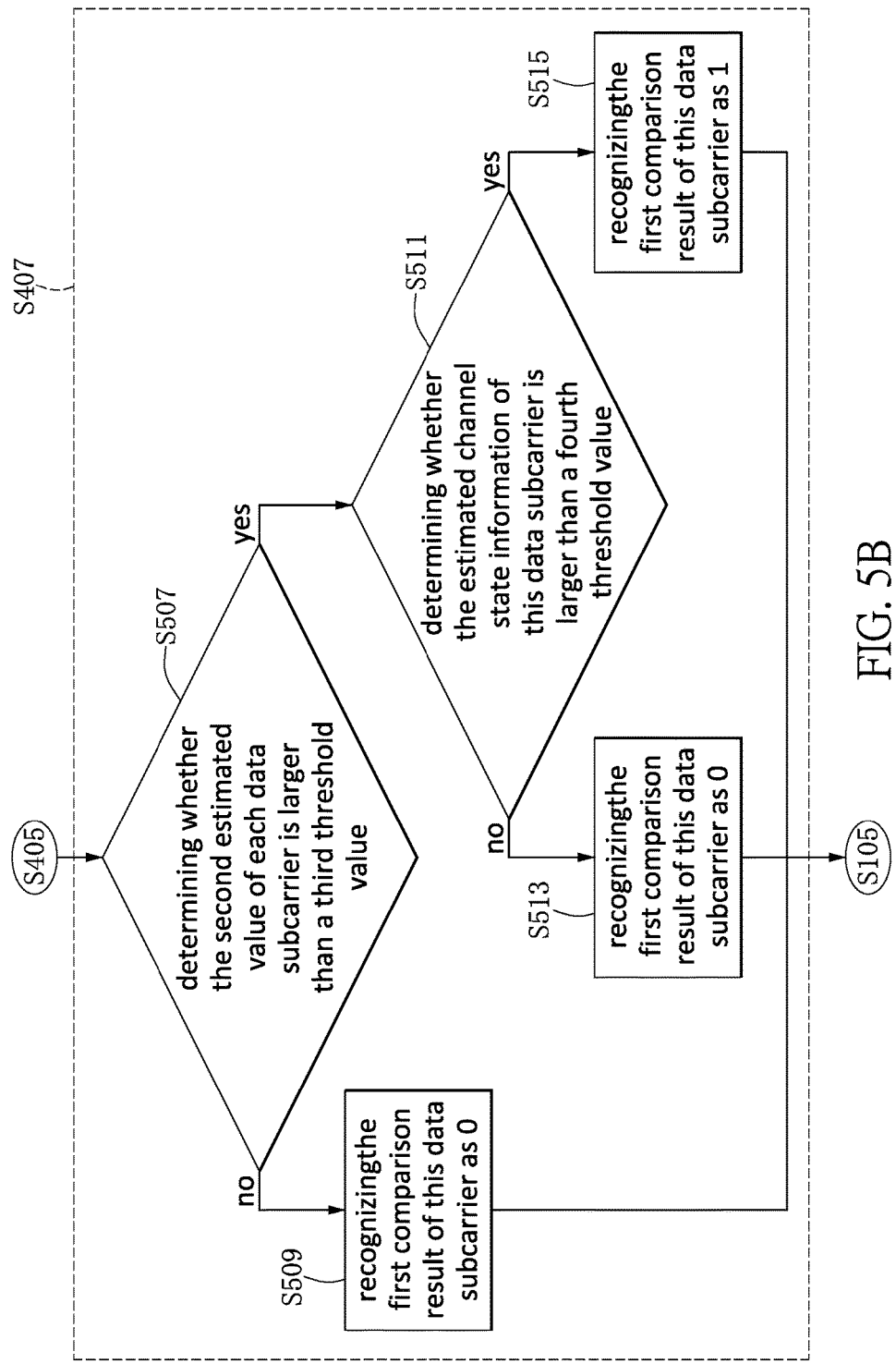
FIG. 5B is a flow chart showing how to recognize the first comparison result corresponding to each data subcarrier in the method shown in FIG. 4.

Referring to FIG. 5A, FIG. 5B and the above description about step S403 and step S407 shown in FIG. 4, FIG. 5A is a flow chart showing how to recognize the first comparison result corresponding to each non-data subcarrier in the method shown in FIG. 4, and FIG. 5B is a flow chart showing how to recognize the first comparison result corresponding to each data subcarrier in the method shown in FIG. 4. In brief, FIG. 5A and FIG. 5B respectively show an embodiment of step S403 and step S407 shown in FIG. 4, but the instant disclosure is not thus restricted. In addition, similar reference numbers or symbols refer to steps alike in FIG. 5A, FIG. 5B and FIG. 4.

Referring to FIG. 4 and FIG. 5A, step S403 further comprises steps S501~S505. In step S501, the receiver determines whether the second estimated value of each non-data subcarrier is larger than a second threshold value. Then, in step S503, when the second estimated value of a non-data subcarrier is not larger than the second threshold value, the first comparison result of this non-data subcarrier is recognized as 0. On the other hand, in step S505, when the second estimated value of a non-data subcarrier is larger than the second threshold value, the first comparison result of this non-data subcarrier is recognized as 1.

For an easy illustration, the amount of the non-data subcarriers is assumed to be 1160 in the following description, such as the non-data subcarriers NDc_1~NDc_1160. In the embodiment shown by FIG. 5A, for each of the non-data subcarriers NDc_1~NDc_1160, when the second estimated value of a non-data subcarrier NDc_a is larger than the second threshold value, the first comparison result of this non-data subcarrier NDc_a is recognized as 1. On the other hand, when the second estimated value of a non-data subcarrier NDc_a is not larger than the second threshold value, the first comparison result of this non-data subcarrier NDc_a is recognized as 0. In the above description, "a" of "NDc_a" is an integer from 1 to 1160. As a result, after executing the steps shown by FIG. 5A, the first comparison result of each non-data subcarrier NDc_1~NDc_1160 can be obtained, which may be 1 or 0.

From the above, it can be known that the steps shown by FIG. 5A are to preliminarily determine if any of the non-data subcarriers is an abnormal subcarrier (that is, if any non-data subcarrier is affected by CCI). When the first comparison result is recognized as 1, the corresponding non-data subcarrier is considered an abnormal subcarrier. On the contrary, when the first comparison result is recognized as 0, the corresponding non-data subcarrier is not considered an abnormal subcarrier.

Referring to FIG. 4 and FIG. 5B, step S407 further comprises steps S507~S515. In step S507, the receiver determines whether the second estimated value of each data subcarrier is larger than a third threshold value. Then, in step S509, when the second estimated value of a data subcarrier is not larger than the third threshold value, the first comparison result of this data subcarrier is recognized as 0. After that, in step S511, when the second estimated value of a data subcarrier is larger than the third threshold value, it is further to determine whether the estimated channel state information (CSI) of this data subcarrier is larger than a fourth threshold value.

In step S513, if the CSI of this data subcarrier is not larger than the fourth threshold value, the first comparison result of this data subcarrier is recognized as 0. On the other hand, in step S515, if the CSI of this data subcarrier is larger than the fourth threshold value, the first comparison result of this data subcarrier is recognized as 1.

For an easy illustration, the amount of the data subcarriers is assumed to be 4640 in the following description, such as the data subcarriers Dc_1~Dc_4640. In the embodiment shown by FIG. 5B, for each of the data subcarriers Dc_1~Dc_4640, when the second estimated value of a data subcarrier Dc_b is not larger than the third threshold value, the first comparison result of this data subcarrier Dc_a is recognized as 0. In other words, the corresponding data subcarrier Dc_b will not be considered an abnormal subcarrier.

However, when the second estimated value of a data subcarrier Dc_b is larger than the third threshold value, the receiver further determines whether the CSI of this data subcarrier Dc_b is larger than a fourth threshold value. Thereby, it can be preliminarily determined whether this data subcarrier Dc_b is affected by CCI. In the above description, "b" of "Dc_b" is an integer from 1 to 4640.

The reason why it is necessary to further determine whether the CSI of this data subcarrier Dc_b is larger than the fourth threshold value is that, even when the second estimated value of this data subcarrier Dc_b is larger than the third threshold value, it is still possible that this data subcarrier Dc_b is not an abnormal subcarrier. In order to avoid a misjudgment, the receiver considers this data subcarrier Dc_b an abnormal subcarrier only when the CSI of this data subcarrier Dc_b is larger than the fourth threshold value (that is, the first comparison result of this data subcarrier Dc_b is recognized as 1).

From the above, it can be known that the steps shown by FIG. 5B are to preliminarily determine if any of the data subcarriers is an abnormal subcarrier (that is, if any data subcarrier is affected by CCI). It should be noted that, to avoid a misjudgment that may occur when determining whether a data subcarrier is an abnormal subcarrier, in this embodiment, the receiver further takes the CSI of a data subcarrier as another reference to again check whether this data subcarrier is an abnormal subcarrier. One example is provided in the following description to show how to obtain the CSI of a data subcarrier; however, the instant disclosure is not thus restricted.

A preferable way to obtain the CSI of a data subcarrier is based on the channel impulse response of this data subcarrier. Again referring to FIG. 1, after executing step S103, a first comparison result, which may be 1 or 0, can be obtained for each subcarrier (a data subcarrier or a non-data subcarrier). Then, an N×K error matrix is generated according to these obtained first comparison results. A preferable way to generate this N×K error matrix is to take the first comparison result of each subcarrier as an element of this N×K error matrix according to the sequence of the subcarrier.

Figure 6:
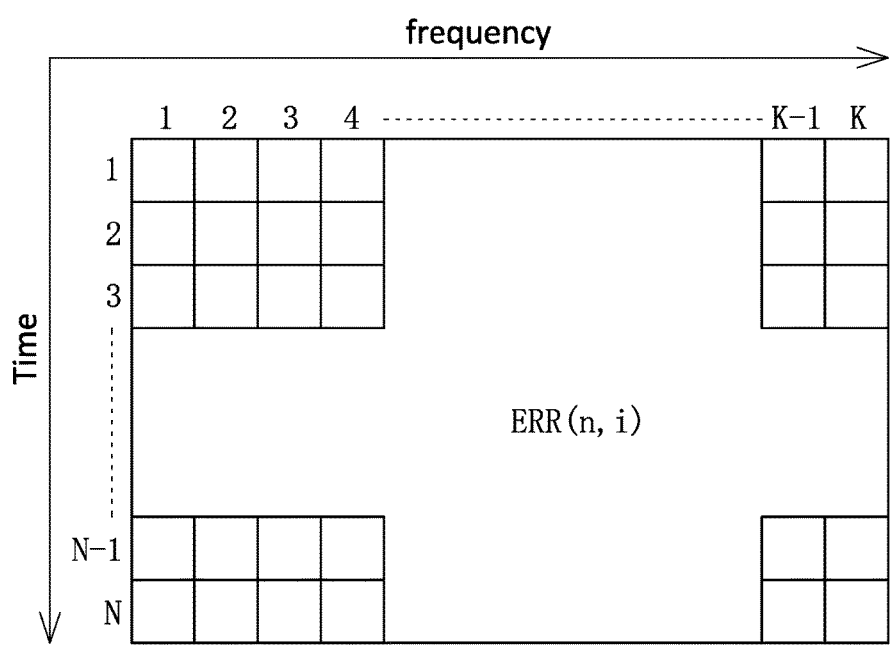
FIG. 6 shows a schematic diagram of an N×K error matrix in a signal processing method for suppressing CCI of one embodiment of the instant disclosure.

For example, referring to FIG. 6, FIG. 6 shows a schematic diagram of an N×K error matrix in a method for suppressing CCI of one embodiment of the instant disclosure. In this example, N is assumed to be 32 and K is assumed to be 580. In other words, each symbol comprises 580 subcarriers. In step S105, the receiver takes the 580 first comparison results of the subcarriers of the first symbol as the elements ERR(1,1)~ERR(1,580) of the N×K error matrix.

Then, the receiver takes the 580 first comparison results of the subcarriers of the second symbol as the elements ERR(2,1)~ERR(2,580) of the N×K error matrix, and so on. Finally, the receiver takes the 580 first comparison results of the subcarriers of the $32^{th}$ symbol as the elements ERR(32, 1)~ERR(32,580) of the N×K error matrix.

In this manner, rows and columns of the N×K error matrix can, for instance, show a relationship between the time and the frequency, as shown in FIG. 6. Thus, the sum of each column of the N×K error matrix generated in step S105 can be represented as the equation (1) as below.

$$SUM(i) = \sum_{n=1}^{N} ERR(n,i)$$

The equation (1):

In the equation (1), SUM(i) is the sum of the $i^{th}$ column of the N×K error matrix, and "i" in this equation is an integer from 1 to K.

In another example to generate a N×K error matrix is to take one first comparison result of one of the 580 subcarriers of the first symbol as the elements ERR(1: T,1)~ERR(1: T,580) of the N×K error matrix, wherein T is an integer larger than or equal to 2 but less than N. Specifically speaking, if T is 2, the first comparison result of the first subcarrier of the first symbol is taken as the elements ERR(1,1) and ERR(2,1) of the N×K error matrix. Then, the first comparison result of the second subcarrier of the first symbol is taken as the elements ERR(1,2) and ERR(2,2) of the N×K error matrix, and so on. In this manner, the first comparison result of the $580^{th}$ subcarrier of the first symbol is taken as the elements ERR(1,580) and ERR(2,580) of the N×K error matrix.

Likewise, one first comparison result of one of the 580 subcarriers of the $\alpha^{th}$ symbol as the elements ERR(($\alpha$−1) *T+1: $\alpha$*T,1)~ERR(($\alpha$−1)*T+1: $\alpha$*T,580) of the N×K error matrix. Specifically speaking, the first comparison result of the first subcarrier of the second symbol is taken as the elements ERR(3,1) and ERR(4,1) of the N×K error matrix. Then, the first comparison result of the second subcarrier of the second symbol is taken as the elements ERR(3,2) and ERR(4,2) of the N×K error matrix, and so on. Finally, in this manner, the first comparison result of the $580^{th}$ subcarrier of the $16^{th}$ symbol is taken as the elements ERR(31,580) and ERR(32,580) of the N×K error matrix.

In this example, N and T are adjustable for different settings of the receiver, which can optimize the entire system performance. In addition, it should be noted that, the first comparison result obtained in step S103 is either 0 or 1, so the sum SUM(i) of each column of the N×K error matrix will be one real number from 0 to N.

Specifically speaking, in step S107, the receiver sequentially compares the sum SUM(i) of the $i^{th}$ column of the N×K error matrix with each of the M first threshold values TH1_1~TH1. When the sum SUM(i) of the $i^{th}$ column of the N×K error matrix with is larger than the $j^{th}$ first threshold value TH1_j (j is a positive integer from 1 to M), the receiver outputs an adjusting value CLIP) predetermined for the $j^{th}$ first threshold value TH1_j as a second comparison result of the $i^{th}$ column of the N×K error matrix.

It is worth mentioning that the first threshold values TH1_1~TH1_M are sorted decreasingly according to their numerical values. Likewise, the adjusting values CLIP_1~CLIP_M predetermined for the first threshold values TH1_1~TH1_M are also sorted decreasingly according to their numerical values.

For example, if M is 8, the first threshold values TH1_1~TH1_8 are, for example, 16, 14, 12, 10, 8, 6, 4 and 2, and the adjusting values CLIP_1~CLIP_8 predetermined for these first threshold values TH1_1~TH1_8 are, for example, 8, 7, 6, 5, 4, 3, 2 and 1. If the sum SUM(1) of the first column of the N×K error matrix is 13, it can be determined that the third first threshold value TH1_3, which is 12, is the largest one that is less than the sum SUM(1) of the first column of the N×K error matrix. Thus, the receiver outputs the adjusting value CLIP_3, which is 6, predetermined for the third first threshold value TH1_3, as the second comparison result of the first column of the N×K error matrix.

Likewise, if the sum SUM(2) of the second column of the N×K error matrix is 9, it can be determined that the third first threshold value TH1_5, which is 8, is the largest one that is less than the sum SUM(2) of the second column of the N×K error matrix. Thus, the receiver outputs the adjusting value CLIP_5 which is 4, predetermined for the fifth first threshold value TH1_5, as the second comparison result of the second column of the N×K error matrix.

It is worth mentioning that if the sum SUM(i) of the $i^{th}$ column of the N×K error matrix is not larger than any of the first threshold values CLIP_1~CLIP_8, the adjusting value outputted by the receiver is predetermined to be 0, and thus the second comparison result of the $i^{th}$ column of the N×K is 0. According to the above, in step S107, one second comparison result for each column of the N×K error matrix can be obtained, and the second comparison result indicates how a subcarrier is affected by the CCI. The values of the first threshold values TH1_1~TH1_M and the adjusting values CLIP_1~CLIP_M provided above are only examples for illustrating but not for restricting the instant disclosure.

Figure 7:
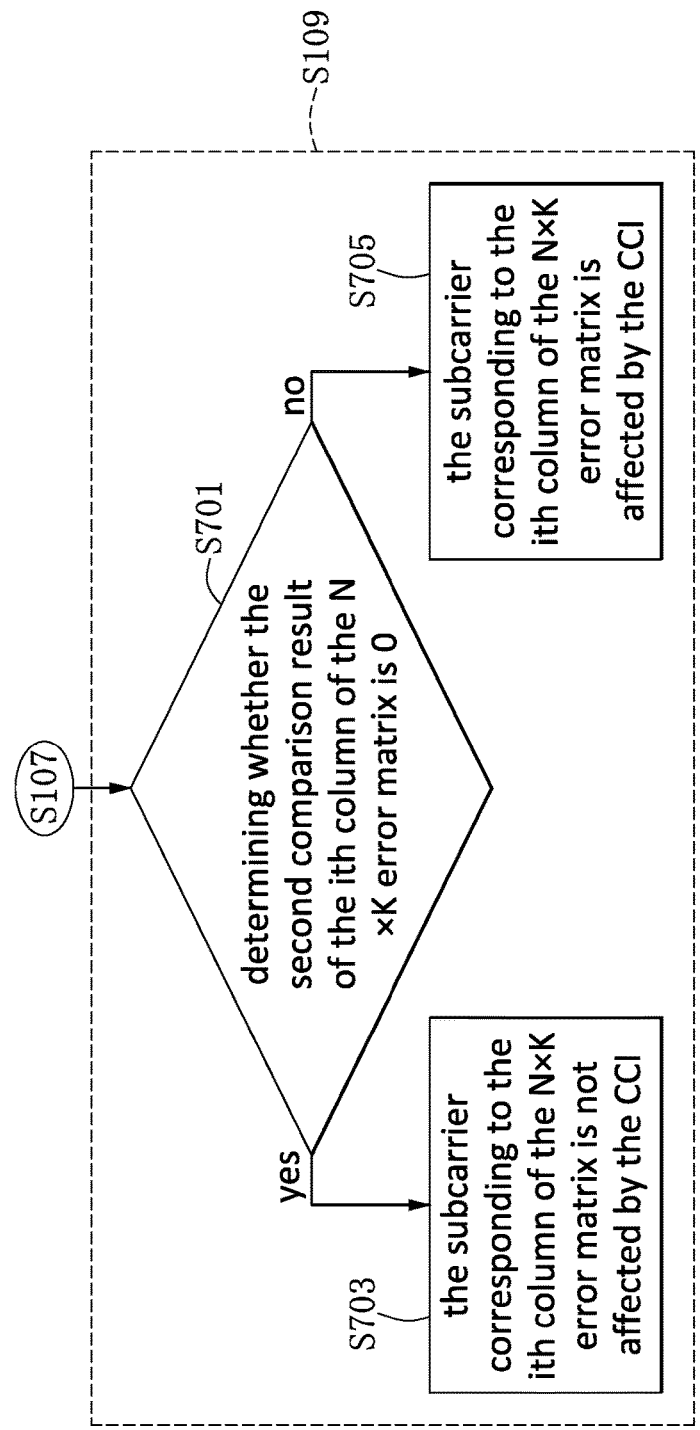
FIG. 7 is a flow chart showing how to determine whether the subcarriers are affected by CCI according to the second comparison results in a signal processing method for suppressing CCI of one embodiment of the instant disclosure.

According to the above, the larger the second comparison result of the $i^{th}$ column of the N×K error matrix is, the worse the effect brought by the CCI to the subcarrier of the $i^{th}$ column of the N×K error matrix is. Referring to FIG. 7, FIG. 7 is a flow chart showing how to determine whether the subcarriers are affected by CCI according to the second comparison results in a method for suppressing CCI of one embodiment of the instant disclosure. Similar reference numbers or symbols refer to similar steps in FIG. 1 and FIG. 7.

As shown in FIG. 7, step S109 further comprises steps S701~S705. Step S701 is to determine whether the second comparison result of the $i^1$ column of the N×K error matrix is 0. In step S703, if the second comparison result of the $i^{th}$ column of the N×K error matrix is 0, it can be determined that the subcarrier corresponding to the $i^1$ column of the N×K error matrix is not affected by the CCI. On the contrary, in step S705, if the second comparison result of the $i^{th}$ column of the N×K error matrix is not 0, it can be determined that the subcarrier corresponding to the $i^{th}$ column of the N×K error matrix is affected by the CCI.

Figure 8:
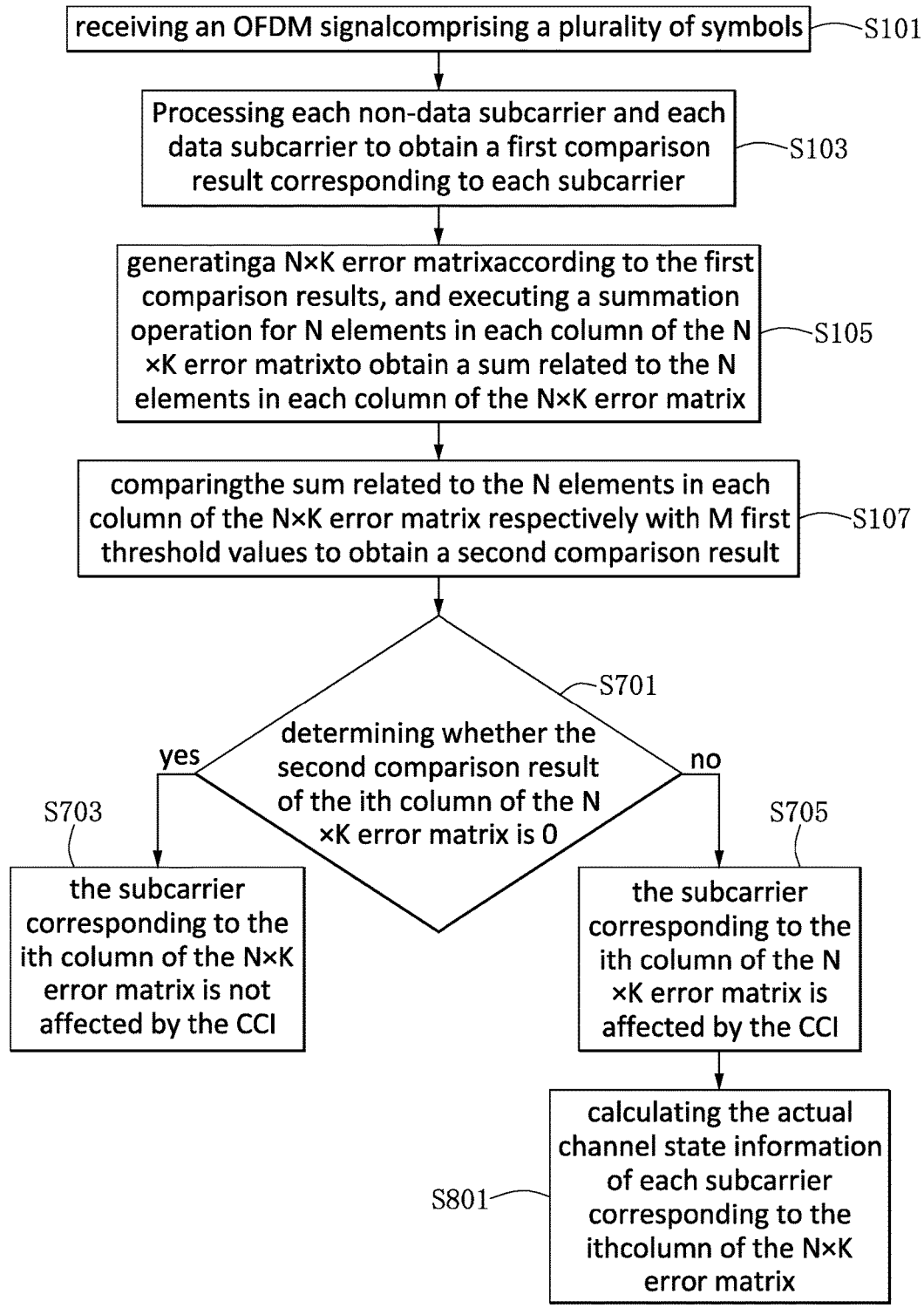
FIG. 8 shows a flow chart of a signal processing method for suppressing CCI of another embodiment of the instant disclosure.

Therefore, how to effectively process the effect brought by the CCI is important for improving the system performance. Referring to FIG. 8, FIG. 8 shows a flow chart of a method for suppressing CCI of another embodiment of the instant disclosure. Similar reference numbers or symbols refer to similar steps in FIG. 8 and FIGS. 1-7. In the method provided by the embodiment shown in FIG. 8, the actual channel state information of the subcarrier that is affected by the CCI is taken into account.

In step S801, when it is determined that the subcarrier corresponding to the $i^{th}$ column of the N×K error matrix is affected by the CCI, the receiver calculates the actual channel state information of each subcarrier corresponding to the $i^{th}$ column of the N×K error matrix. The actual channel state information of the $n^{th}$ subcarrier corresponding to the $i^{th}$ column of the N×K error matrix can be represented by an equation (2) as below.

$$CSI_n'=CSI_n \times CCI_i$$

$CSI_n'$ is the actual channel state information of the $n^{th}$ subcarrier, and $CCI_i$ is the second comparison result of the $i^{th}$ column of the N×K error matrix, wherein n is a positive integer from 1 to N. In this embodiment, the receiver can raise the credibility of the $n^{th}$ subcarrier only by multiplying the second comparison result of the $i^1$ column of the N×K error matrix by the actual channel state information of the $n^{th}$ subcarrier. It is beneficial for the receiver to determine whether the received data is correct. In other words, it will be more accurate to determine whether each subcarrier is affected by CCI.

Figure 9:
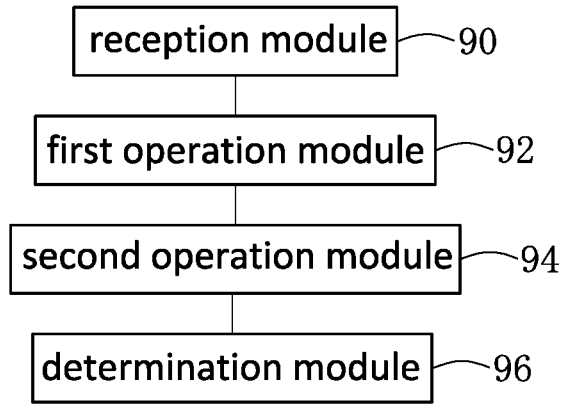
FIG. 9 shows a block diagram of a signal processing circuit for suppressing CCI of one embodiment of the instant disclosure.

Referring to FIG. 9, FIG. 9 shows a block diagram of a circuit for suppressing CCI of one embodiment of the instant disclosure.

The circuit 9 can be used in any receiver in an OFDM system, and comprises a reception module 90, a first operation module 92, a second operation module 94 and a determination module 96. These modules in the circuit 9 can be realized all by hardware circuits, or by hardware circuits and the firmware or the software. In addition, the reception module 90, the first operation module 92, the second operation module 94 and the determination module 96 can be integrated or configured separately.

As described above, the method for suppressing CCI provided by the instant disclosure is executed after the signal synchronization of the OFDM signal is completed. Thus, the OFDM signal received by the receiver is an OFDM signal that has been synchronized. In addition, the method provided by the embodiment shown in FIG. 1 can be executed by the circuit 9 in this embodiment, and thus please refer to FIG. 1 for an easy understanding.

Specifically speaking, the reception module 90 receives an OFDM signal comprising a plurality of symbols, and the subcarrier may be a non-data subcarrier or a data subcarrier. The first operation module 92 processes the non-data subcarriers and the data subcarriers of each symbol to obtain the first comparison result corresponding to each subcarrier.

The second operation module 94 generates an N×K error matrix according to the first comparison results received from the first operation module 92. In addition, the second operation module 94 performs a summation operation for the N elements in each column of the N×K error matrix to obtain the sum of each column of the N×K error matrix.

The summation operation 96 compares the sum of each column of the N×K error matrix with one of the M first threshold values, to obtain a second comparison result of each column of the N×K error matrix. In addition, the summation operation 96 determines whether the subcarriers are affected by CCI according to these second comparison results. Similarly, K and M are positive integers, and N is a variable that is varied with different settings of the receiver.

In this embodiment, the methods provided in the embodiments shown in FIG. 2~FIG. 5B can be executed by the first operation module 92, and thus please refer to FIG. 2~FIG. 5B for an easy understanding.

Moreover, after the determination module 96 compares the sum of the $i^{th}$ column of the N×K error matrix with each of the M first threshold values, when the sum of the $i^{th}$ column of the N×K error matrix is larger than the $j^{th}$ first threshold value, the determination module 96 outputs an adjusting value as a second comparison result of the $i^{th}$ column of the N×K error matrix. Particularly, this adjusting value is predetermined for the $j^{th}$ first threshold value. On the other hand, when the sum of the $i^{th}$ column of the N×K error matrix is not larger than any first threshold value, the determination module 96 outputs an adjusting value, which is 0, as a second comparison result of the $i^{th}$ column of the N×K error matrix. The method provided in the embodiment shown in FIG. 7 can be executed by the determination module 96, and thus please refer to FIG. 2~FIG. 5B for an easy understanding.

Figure 10:
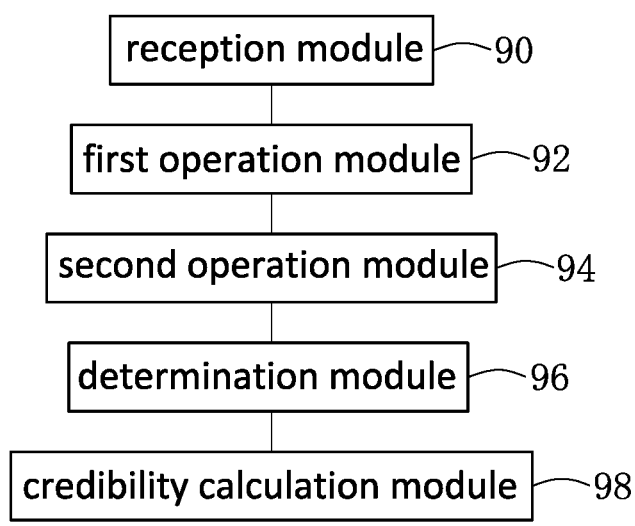
FIG. 10 shows a block diagram of a signal processing circuit for suppressing CCI of another embodiment of the instant disclosure.

Referring to FIG. 10, FIG. 10 shows a block diagram of a circuit for suppressing CCI of another embodiment of the instant disclosure. Compared with the circuit 9 shown in FIG. 9, the circuit 9' shown in FIG. 10 further comprises a credibility calculation module 98. Similarly, the credibility calculation module 98 can be realized all by hardware circuits, or by hardware circuits and firmware or software.

When the determination module 96 determines that the subcarriers corresponding to the $i^{th}$ column of the N×K error matrix are affected by CCI, the credibility calculation module 98 calculates the actual channel state information of each subcarrier corresponding to the $i^{th}$ column of the N×K error matrix according to the equation (2) described above.

To sum up, in the working mechanism of the circuit and the method for suppressing CCI provided by the instant disclosure, the non-data subcarrier and the data subcarrier are both processed, which makes it more accurate to determine whether each subcarrier is affected by CCI. In addition, the results to determine whether the subcarriers are affected by CCI are recorded as an N×K error matrix, and thus the receiver can know the static interference and the dynamic interference according to this N×K error matrix. Parameters like N and T related to this N×K error matrix can be adjusted according to different settings of the receiver to optimize the entire system performance. Moreover, by using the circuit and the method for suppressing CCI provided by the instant disclosure, the actual channel state information of the subcarrier that is affected by CCI can be obtained and provided to the receiver for determining correctness of each symbol in an OFDM signal.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A signal processing method for suppressing co-channel interference, adapted to a receiver in an Orthogonal Frequency-Division Multiplexing (OFDM) system, the signal processing method comprising:
   receiving an OFDM signal comprising a plurality of symbols by the receiver, wherein each symbol comprises K subcarriers and each of the K subcarriers is a non-data subcarrier or a data subcarrier;
   processing each non-data subcarrier and each data subcarrier related to each of the plurality of the symbols to obtain a first comparison result corresponding to each subcarrier;
   generating a N×K error matrix according to the first comparison results, and respectively executing a summation operation for N elements in each column of the N×K error matrix to obtain a sum related to the N elements in each column of the N×K error matrix; and
   respectively comparing the sum related to the N elements in each column of the N×K error matrix with M first threshold values to obtain a second comparison result corresponding to each column of the N×K error matrix, and determining whether the subcarriers are affected by co-channel interference according to each second comparison result;
   wherein K and M are both positive integers, and N is a variable and varies with different settings of the receiver.

2. The signal processing method according to claim 1, wherein the OFDM system is an Integrated Services Digital Broadcasting system, a Digital Video Broadcasting over Terrestrial system, a second-generation Digital Video Broadcasting over Terrestrial system.

3. The signal processing method according to claim 1, wherein the step of processing each non-data subcarrier and each data subcarrier related to each of the plurality of the symbols to obtain the first comparison result corresponding to each subcarrier further comprises:
   processing the non-data subcarriers and the data subcarriers to obtain a first estimated value for each subcarrier, and recognizing the first comparison result corresponding to each subcarrier according to the first estimated value of each subcarrier.

4. The signal processing method according to claim 3, wherein the step of processing the non-data subcarriers and the data subcarriers to obtain the first estimated value for each subcarrier further comprises:
   using the non-data subcarriers to execute an interpolation operation in both the time domain and the frequency domain of the non-data subcarriers to estimate a channel impulse response corresponding to each subcarrier, and when the interpolation operation in the time domain of the non-data subcarriers is completed, respectively extracting a time-domain interpolation result responding to each symbol; and
   executing an equalization operation for each data subcarrier and the corresponding channel impulse response to obtain the first estimated value related to each data subcarrier of the symbol, executing a modulo operation for each extracted time-domain interpolation result to obtain the first estimated value related to each non-data subcarrier of the symbol, and thereby obtaining the first estimated value related to each subcarrier.

5. The signal processing method according to claim 3, wherein the step of recognizing the first comparison result corresponding to each subcarrier according to the first estimated value of each subcarrier further comprises:
   executing a differentiation operation and the modulo operation for the first estimated values of the non-data subcarriers to obtain a second estimated value related to each non-data subcarrier, and comparing the second estimated value with a second threshold value to recognize the first comparison result corresponding to each non-data subcarrier; and
   executing a partition operation and the modulo operation for the first estimated values of the data subcarriers to obtain the second estimated value related to each data subcarrier, comparing each second estimated value with a third threshold value to recognize the first comparison result corresponding to each data subcarrier, and thereby recognizing the first comparison result corresponding to each subcarrier.

6. The signal processing method according to claim 5, wherein the step of comparing the second estimated value with the second threshold value to recognize the first comparison result corresponding to each non-data subcarrier further comprises:
   determining whether the second estimated value of each non-data subcarrier is larger than the second threshold value;
   when the second estimated value of each non-data subcarrier is not larger than the second threshold value, recognizing that the first comparison result of the non-data subcarrier is 0; and when the second estimated value of each non-data subcarrier is larger than the second threshold value, recognizing that the first comparison result of the non-data subcarrier is 1.

7. The signal processing method according to claim 5, wherein the step of comparing each second estimated value with the third threshold value to recognize the first comparison result corresponding to each data subcarrier and thereby recognizing the first comparison result corresponding to each subcarrier further comprises:

determining whether the second estimated value of each data subcarrier is larger than the third threshold value;

when the second estimated value of each data subcarrier is not larger than the third threshold value, recognizing that the first comparison result of the data subcarrier is 0;

when the second estimated value of each data subcarrier is larger than the third threshold value, further determining whether an estimated channel state information of the data subcarrier is larger than a fourth threshold value;

when the estimated channel state information of the data subcarrier is not larger than the fourth threshold value, recognizing that the first comparison result of the data subcarrier is 0; and when the estimated channel state information of the data subcarrier is larger than the fourth threshold value, recognizing that the first comparison result of the data subcarrier is 1.

8. The signal processing method according to claim 1, wherein the step of respectively comparing the sum related to the N elements in each column of the N×K error matrix with M first threshold values to obtain the second comparison result corresponding to each column of the N×K error matrix further comprises:

comparing the sum of the elements in the $i^{th}$ column of the N×K error matrix with each of the M first threshold values, and when the sum of the elements in the $i^{th}$ column of the N×K error matrix is larger than the $j^{th}$ first threshold value of the M first threshold values, outputting an adjusting value predetermined by the $j^{th}$ first threshold value as the second comparison result of the $i^{th}$ column of the N×K error matrix, wherein i is a positive integer from 1 to K and j is a positive integer from 1 to M;

wherein the M first threshold values are arranged according to their decreasing values, and the M adjusting values predetermined by the M first threshold values are sorted decreasingly according to their values.

9. The signal processing method according to claim 8, wherein when the sum of the elements in the $i^{th}$ column of the N×K error matrix is not larger than each first threshold value, the outputted adjusting value is 0, and thus the second comparison result of the $i^{th}$ column of the N×K error matrix is recognized as 0.

10. The signal processing method according to claim 9, wherein when the second comparison result of the $i^{th}$ column of the N×K error matrix is not 0, it is determined that the subcarriers corresponding to the $i^{th}$ column of the N×K error matrix are affected by co-channel interference.

11. The signal processing method according to claim 10, wherein when it is determined that the subcarriers corresponding to the $i^{th}$ column of the N×K error matrix are affected by co-channel interference, the method further comprises:

calculating an actual channel state information of each subcarrier corresponding to the $i^{th}$ column of the N×K error matrix, wherein the actual channel state information of the $n^{th}$ subcarrier corresponding to the $i^{th}$ column of the N×K error matrix is $CSI_n'$, wherein $CSI_n'=CSI_n \times CCI_i$, $CSI_n$ is the estimated channel state information of the $n^{th}$ subcarrier, $CCI_i$ is the second comparison result of the $i^{th}$ column of the N×K error matrix, and n is a positive integer from 1 to N.

12. A signal processing circuit for suppressing co-channel interference, used in a receiver in an Orthogonal Frequency-Division Multiplexing (OFDM system, the signal processing circuit comprising:

a reception circuit, receiving an OFDM signal comprising a plurality of symbols, wherein each symbol comprises K subcarriers and each of the K subcarriers is a non-data subcarrier or a data subcarrier;

a first operation circuit, connected to the reception circuit, processing each non-data subcarrier and each data subcarrier related to each of the plurality of symbols to obtain a first comparison result corresponding to each subcarrier;

a second operation circuit, connected to the first operation circuit, generating a N×K error matrix according to the first comparison results, and respectively executing a summation operation for N elements in each column of the N×K error matrix to obtain a sum related to the N elements in each column of the N×K error matrix; and a determination circuit, connected to the second operation circuit, respectively comparing the sum related to the N elements in each column of the N×K error matrix with M first threshold values to obtain a second comparison result corresponding to each column of the N×K error matrix, and determining whether the subcarriers are affected by co-channel interference according to each second comparison result;

wherein K and M are both positive integers, and N is a variable and varies with different settings of the receiver.

13. The signal processing circuit according to claim 12, wherein the OFDM system is an Integrated Services Digital Broadcasting system, a Digital Video Broadcasting over Terrestrial system, a second-generation Digital Video Broadcasting over Terrestrial system.

14. The signal processing circuit according to claim 12, wherein the first operation circuit executes steps to obtain the first comparison result corresponding to each subcarrier, and the steps comprise:

processing the non-data subcarriers and the data subcarriers to obtain a first estimated value corresponding to each subcarrier, and recognizing the first comparison result corresponding to each subcarrier according to the first estimated value of each subcarrier.

15. The signal processing circuit according to claim 14, wherein the step of processing the non-data subcarriers and the data subcarriers to obtain the first estimated value corresponding to each subcarrier further comprises:

using the non-data subcarriers to execute an interpolation operation in both the time domain and the frequency domain of the non-data subcarriers to estimate a channel impulse response corresponding to each subcarrier, and when the interpolation operation in the time domain of the non-data subcarriers is completed, respectively extracting a time-domain interpolation result responding to each symbol; and executing an equalization operation for each data subcarrier and the corresponding channel impulse response to obtain the first estimated value related to each data subcarrier of the symbols, executing a modulo operation for each extracted time-domain interpolation result to obtain the first estimated value related to each non-data subcarrier of the symbol, and thereby obtaining the first estimated value related to each subcarrier.

16. The signal processing circuit according to claim 14, wherein the first operation circuit executes steps to recognize the first comparison result corresponding to each subcarrier according to the first estimated value of each subcarrier, the steps comprise:

executing a differentiation operation and the modulo operation for the first estimated values of the non-data subcarriers to obtain a second estimated value related to each non-data subcarrier, and comparing the second estimated value with a second threshold value to recognize the first comparison result corresponding to each non-data subcarrier; and executing a partition operation and the modulo operation for the first estimated values of the data subcarriers to obtain the second estimated value related to each data subcarrier, comparing each second estimated value with a third threshold value to recognize the first comparison result corresponding to each data subcarrier, and thereby recognizing the first comparison result corresponding to each subcarrier.

17. The signal processing circuit according to claim 16, wherein the step of comparing the second estimated value with the second threshold value to recognize the first comparison result corresponding to each non-data subcarrier further comprises:

determining whether the second estimated value of each non-data subcarrier is larger than the second threshold value;

when the second estimated value of each non-data subcarrier is not larger than the second threshold value, recognizing that the first comparison result of the non-data subcarrier is 0; and when the second estimated value of each non-data subcarrier is larger than the second threshold value, recognizing that the first comparison result of the non-data subcarrier is 1.

18. The signal processing circuit according to claim 16, wherein the step of comparing each second estimated value with the third threshold value to recognize the first comparison result corresponding to each data subcarrier further comprises:

determining whether the second estimated value of each data subcarrier is larger than the third threshold value;

when the second estimated value of each data subcarrier is not larger than the third threshold value, recognizing that the first comparison result of the data subcarrier is 0;

when the second estimated value of each data subcarrier is larger than the third threshold value, further determining whether an estimated channel state information of the data subcarrier is larger than a fourth threshold value;

when the estimated channel state information of the data subcarrier is not larger than the fourth threshold value, recognizing that the first comparison result of the data subcarrier is 0; and when the estimated channel state information of the data subcarrier is larger than the fourth threshold value, recognizing that the first comparison result of the data subcarrier is 1.

19. The signal processing circuit according to claim 12, wherein the determination circuit executes steps to obtain the second comparison result corresponding to each column of the N×K error matrix further comprises:

comparing the sum of the elements in the $i^{th}$ column of the N×K error matrix with each of the M first threshold values, and when the sum of the elements in the $i^{th}$ column of the N×K error matrix is larger than the $j^{th}$ first threshold value of the M first threshold values, outputting an adjusting value predetermined by the $j^{th}$ first threshold value as the second comparison result of the $i^{th}$ column of the N×K error matrix, wherein i is a positive integer from 1 to K and j is a positive integer from 1 to M;

wherein the M first threshold values are arranged according to their decreasing values, and the M adjusting values predetermined by the M first threshold values are sorted decreasingly according to their values.

20. The signal processing circuit according to claim 19, wherein when the sum of the elements in the $i^{th}$ column of the N×K error matrix is not larger than each first threshold value, the outputted adjusting value is 0 and thus the second comparison result of the $i^{th}$ column of the N×K error matrix is recognized as 0.

21. The signal processing circuit according to claim 20, wherein when the second comparison result of the $i^{th}$ column of the N×K error matrix is not 0, it is determined that the subcarriers corresponding to the $i^{th}$ column of the N×K error matrix are affected by co-channel interference.

22. The signal processing circuit according to claim 21, further comprising:

a credibility calculation circuit, connected to the determination circuit, calculating an actual channel state information of each subcarrier corresponding to the $i^{th}$ column of the N×K error matrix, when it is determined that the subcarriers corresponding to the $i^{th}$ column of the N×K error matrix are affected by the co-channel interference, wherein the actual channel state information of the $n^{th}$ subcarrier corresponding to the $i^{th}$ column of the N×K error matrix is $CSI_n'$, wherein $CSI_n' = CSI_n \times CCI_i$, $CSI_n$ is the estimated channel state information of the $n^{th}$ subcarrier, $CCI_i$ is the second comparison result of the $i^{th}$ column of the N×K error matrix, and n is a positive integer from 1 to N.

* * * * *